(12) United States Patent
Rummel

(10) Patent No.: US 7,789,404 B2
(45) Date of Patent: Sep. 7, 2010

(54) STEERING DAMPER FOR SOLID AXLE STEERING SYSTEM

(75) Inventor: Chad W. Rummel, Farmington Hills, MI (US)

(73) Assignee: Chrysler Group LLC, Auburn Hills, MI (US)

(*) Notice: Subject to any disclaimer, the term of this patent is extended or adjusted under 35 U.S.C. 154(b) by 465 days.

(21) Appl. No.: 11/763,734

(22) Filed: Jun. 15, 2007

(65) Prior Publication Data

US 2008/0309041 A1 Dec. 18, 2008

(51) Int. Cl.
*B62D 7/22* (2006.01)

(52) U.S. Cl. .................. 280/89.13; 280/89.11; 280/90

(58) Field of Classification Search ............. 280/89.13, 280/89.12, 89.11, 90
See application file for complete search history.

(56) References Cited

U.S. PATENT DOCUMENTS

| | | | | |
|---|---|---|---|---|
| 1,103,538 | A | * 7/1914 | Perry | ...................... 280/89.11 |
| 1,119,014 | A | * 12/1914 | Harris | ...................... 280/89.11 |
| 1,167,240 | A | * 1/1916 | Wood | ...................... 280/89.11 |
| 1,625,224 | A | 4/1927 | Seawell | |
| 1,703,592 | A | * 2/1929 | Paton | ...................... 280/89.12 |
| 2,242,593 | A | 5/1941 | Olson | |
| 2,261,155 | A | * 11/1941 | Holbrook | ...................... 280/90 |
| 4,076,264 | A | * 2/1978 | Chatterley | ................. 280/81.6 |
| 4,279,428 | A | 7/1981 | Onodera | |
| 4,558,759 | A | * 12/1985 | Baatrup et al. | ............... 180/403 |
| 6,086,075 | A | 7/2000 | O'Bryan | |
| 6,418,856 | B2 | * 7/2002 | Hossfield et al. | ........ 104/130.01 |
| 6,520,520 | B2 | 2/2003 | Howard | |
| 7,484,743 | B2 | * 2/2009 | Gorodisher et al. | ...... 280/89.13 |

* cited by examiner

*Primary Examiner*—Eric Culbreth
(74) *Attorney, Agent, or Firm*—Ralph E. Smith

(57) ABSTRACT

A steering assembly for a motor vehicle including and axle interconnecting a pair of wheels, a pair of tie rods coupled to the wheels, and a cross bar having a piston mounted thereon interconnecting the rods. A steering damper may be integral with the cross bar such that the piston is housed within said steering damper, and the steering damper may be mounted to the axle.

3 Claims, 2 Drawing Sheets

STEERING DAMPER FOR SOLID AXLE STEERING SYSTEM

FIELD

The present disclosure relates to a steering damper for a motor vehicle.

BACKGROUND

Steering assemblies associated with the wheels of a motor vehicle may include tie rods that connect right- and left-hand steering knuckles so that any given input through a drag link is transferred to both wheels simultaneously without loss of motion. To reduce the feedback of road input to the steering wheel, the steering assembly may also include a steering damper. Generally, the steering damper is a shock absorber interconnected between an axle of the motor vehicle and one of the tie rods. The steering damper assists in damping the feedback of the road input to the steering wheel.

SUMMARY

The present disclosure provides a steering assembly for a motor vehicle including an axle interconnecting a pair of wheels, a pair of tie rods coupled to the wheels, and a cross bar having piston mounted thereon interconnecting the tie rods. A steering damper may be integral with the cross bar such that the piston is housed within the steering damper, and the steering damper may be mounted to the axle.

Further areas of applicability of the present disclosure will become apparent from the detailed description provided hereinafter. It should be understood that the detailed description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

The following description of the preferred embodiments is merely exemplary in nature and is in no way intended to limit the present disclosure, its application, or uses.

Figure 1:
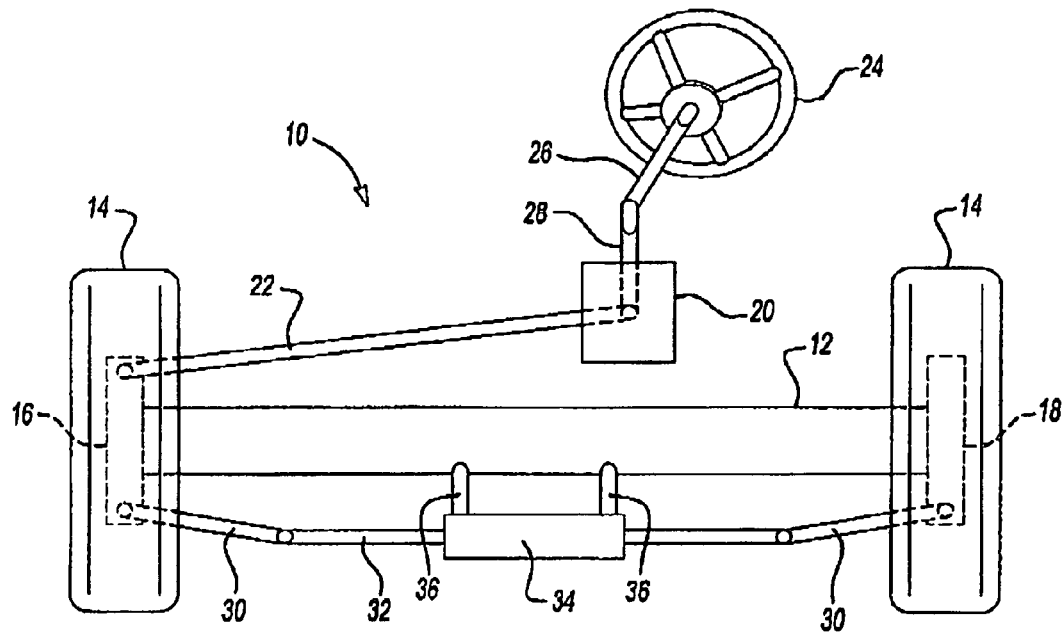
FIG. 1 is a schematic view of a steering system according to the present teachings.

FIG. 1 schematically illustrates a steering assembly 10 for a motor vehicle. Steering assembly 10 generally includes a solid axle 12 interconnecting a pair of wheels 14 through a right-hand knuckle 16 and a left-hand knuckle 18. The pair of wheels 14 may be a pair of front wheels. Right hand knuckle 16 may be connected to a steering gear 20 via a drag link 22. Steering gear 20 may be interconnected to a steering wheel 24 through a steering column 26 and an intermediate shaft 28. Tie rods 30 connect the right- and left-hand knuckles 16 and 18, respectively, such that steering input through drag link 22 is transferred to both wheel 14 simultaneously. In a conventional manner, rotary motion of the steering wheel 24 is converted into a turn motion of the vehicle's wheels 14.

Interconnecting tie rods 30 is a cross bar 32 having a steering damper 34. Cross bar 32 may be a generally tubular member that passes through steering damper 34 such that steering damper 34 is integral with cross bar 32. Steering damper 34 may be attached to axle 12 via mounting brackets 36.

Figure 2:
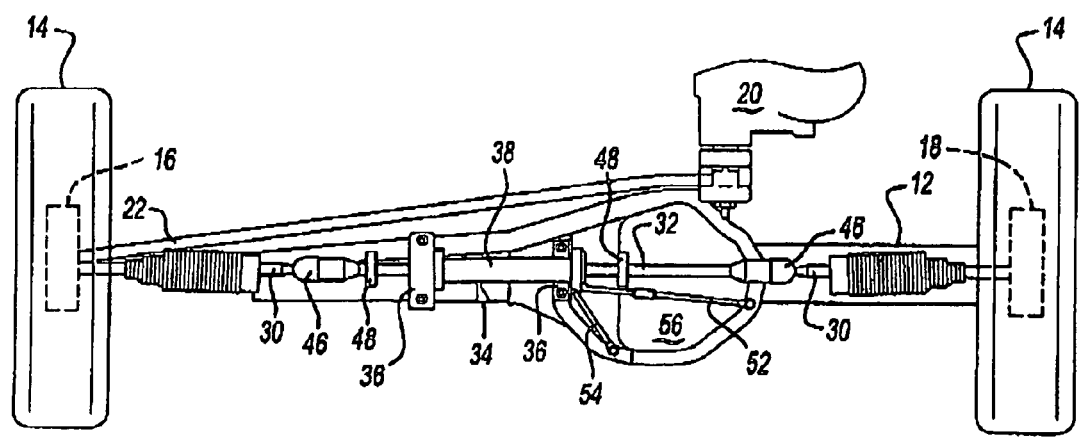
FIG. 2 is a perspective view of a steering damping according to the present teachings.
Figure 3:
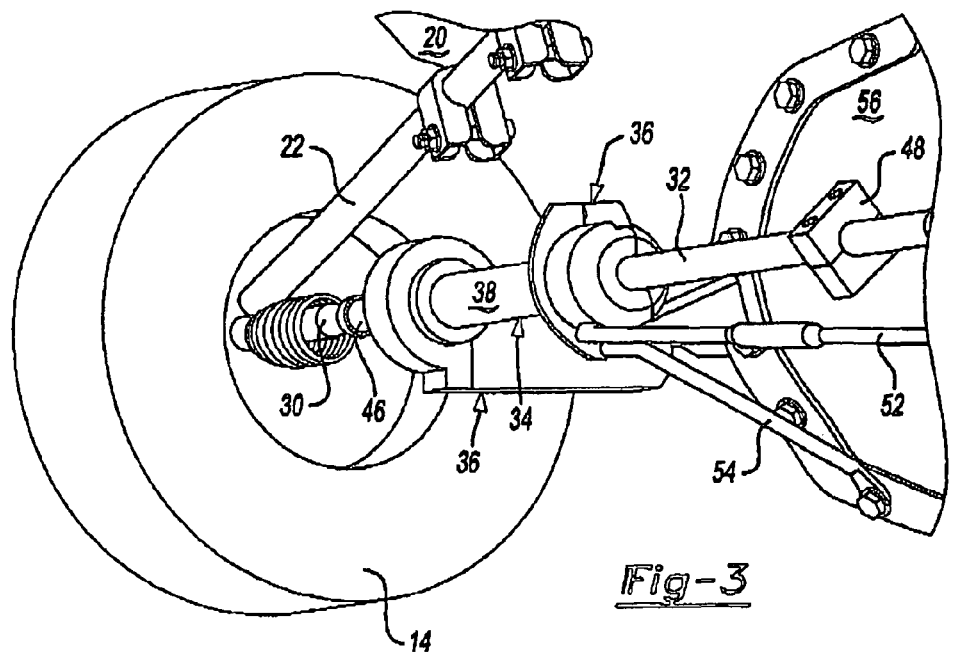
FIG. 3 is a perspective view illustrating a mounting assembly that may be used to attach the steering damper to an axle.
Figure 4:
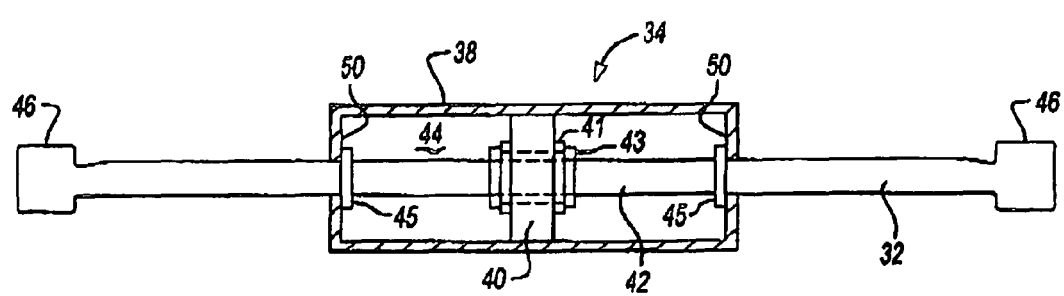
FIG. 4 is a cross-sectional view of the steering damper according to the present teachings.

Now referring to FIGS. 2-4, steering damper 34 may be a cylinder 38 housing a piston 40 that is fixed to a portion 42 of cross bar 32 that is housed by cylinder 38. An interior 44 of cylinder 38 may be filled with a damping fluid or oil. During operation of the motor vehicle, any feedback of road input to steering damper 34 is damped by movement of piston 40 through the damping fluid. Piston 40 may include various thin discs and coil springs schematically represented at 41 and 43, respectively, that allow damping fluid to pass therethrough and assist in damping feedback from the road. To prevent damping fluid from leaking from steering damper 34, seals 45 may be disposed around cross bar 32 at interior walls 50 of cylinder 38.

Steering damper 34 may be fixedly mounted to axle 12 via mounts 36. Since cross bar 32 may be connected to tie rods 30 via a fitting 46, movement of tie rods 30 and cross bar 32 along with steering knuckles 16 and 18 when wheels 14 are turned pulls piston 40 through the damping fluid housed by cylinder 38. Any feedback from the road experienced by steering assembly 10 is directly translated through tie rods 30 and cross bar 32 to damping fluid within cylinder 38. Travel of piston 40 through the damping fluid also assists in damping any feedback from the road during operation of the vehicle.

Fitting 46 may accommodate a ball joint (not shown) formed at an end of tie rod 30. At opposite ends of cylinder 38 on cross bar 32 may be disposed stops schematically represented at 48. Stops 48 limit movement of cross bar 32 and piston 40 through cylinder 38. Depending on a length of cylinder 38, stops 48 may be spaced apart from cylinder 38 at an appropriate distance to limit contact between piston 40 and interior walls 50 of cylinder 38.

Brackets 36 directly mount cylinder 38 to axle 18. Additional connection arms 52 and 54 may be used to secure cylinder 38 to differential 56 of axle 18 (See FIGS. 2 and 3). By mounting cylinder 38 to axle 18 with brackets 36, cylinder 38 is more robustly mounted to axle 18 and reduces the number of parts associated with steering assembly 10. A reduction in parts decreases the manufacturing costs associated with manufacturing steering assembly 10, and reduces the time needed to install steering assembly 10. Accordingly, costs associated with labor and materials may be reduced, as well as the cost of packaging the steering assembly 10 after it has been manufactured.

Although a pair of brackets 36 are used to mount cylinder 38 to axle 18, it should be understood that only a single bracket 36 is need to mount cylinder 38 to axle 18. Alternatively, brackets 36 may be omitted in favor of connection arms 52 and 54, or cylinder 38 may be mounted to a connection surface that is mounted to a vehicle frame (not shown). Regardless, mounting cylinder 38 to axle 18 or differential 56 increases the efficiency of damping feedback from the road during operation of the vehicle.

Although directly mounting cylinder 38 to axle 18 or differential 56 increases the efficiency of damping feedback from the road, it should be understood that passing cross bar 32 directly through steering damper 34 also increases the efficiency of damping feedback from the road. In particular, feedback from the road is more directly transferred through tie rods 30 to cross bar 32, and then to steering damper 34. The direct transfer of feedback to steering damper 34 integral with cross bar 32 directly transfers the energy associated with the feedback to the damping fluid within cylinder 38. Vibrations experienced by steering assembly 10, therefore, may be effectively reduced.

The above description is merely exemplary in nature and, thus, variations that do not depart from the gist of the present disclosure are intended to be within its scope. Such variations are not to be regarded as a departure from the spirit and scope of the present disclosure.

What is claimed is:

1. A steering assembly, comprising:
    an axle interconnecting a pair of wheels through a first steering knuckle and a second steering knuckle;
    a steering gear connected to one of said first and second steering knuckles via a drag link;
    a first tie rod connected to said first steering knuckle;
    a second tie rod connected to said second steering knuckle;
    a cross-bar including a piston, and connecting said first tie rod to said second tie rod; and
    a steering damper directly mounted to said axle and coupled to said cross-bar such that said cross-bar passes through said steering damper and said piston is located within said steering damper,
    wherein said steering damper is directly mounted to said axle by a pair of mounts, and said axle comprises a differential, and said steering damper is mounted to said differential by at least one connection arm.

2. The steering assembly of claim 1, further comprising a pair of stops mounted to said cross-bar at positions outside said steering damper and distal a terminal end of said cross-bar, said stops limiting movement of said piston within said steering damper.

3. The steering assembly of claim 1, wherein said steering damper is a cylinder filled with a damping fluid.

* * * * *